Figure 1:
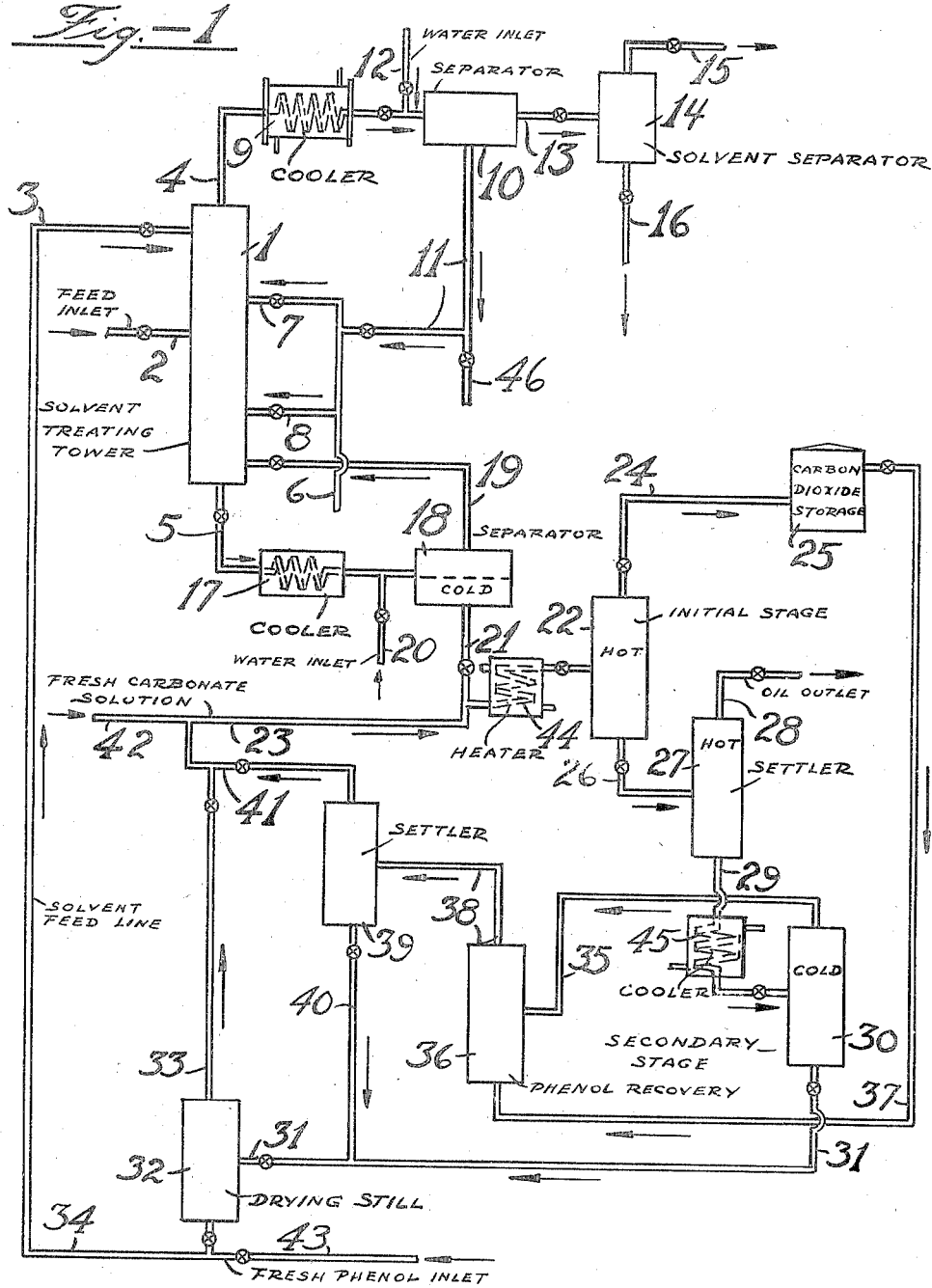

Patented June 17, 1941

2,246,376

UNITED STATES PATENT OFFICE 2,246,376

SOLVENT TREATING OF MINERAL OILS

Charles S. Lynch, Fanwood, N. J., assignor to Standard Oil Development Company, a corporation of Delaware Application August 26, 1939, Serial No. 292,045

7 Claims. (Cl. 196—13)

The present invention relates to the segregation of mineral oils into their relatively more aromatic fractions and into their relatively more paraffinic fractions. The invention especially relates to a solvent treating system in which the selective solvent after separation of the respective phases is recovered without the necessity of distillation. In accordance with the present invention the recovery of the solvent from the raffinate phase and from the solvent extract phase is accomplished by forming a salt of said solvent, subjecting the phase to conditions adapted to secure the formation of an aqueous solvent salt layer and an oil layer, separating the oil and recovering the solvent from the solvent salt layer by reacting the readily decomposable salt.

It is well known in the art to treat oils, particularly petroleum oils, with various solvents in order to separate these oils into their relatively more aromatic or hydrogen poor constituents and into their relatively more paraffinic or hydrogen rich constituents. In these processes solvents of the class having a preferential selectivity for the aromatic constituents are usually employed. Solvents of this class are, for example, phenol, furfural, sulfur dioxide, cresol, nitrobenzene, aniline, beta beta dichlor diethyl ether and the like. The solvent and the oil are contacted by various means, as for example, by a batch or multi-batch process. However, in general, the usual procedure is to contact the solvent and the oil in a countercurrent tower treating operation. In this operation the lighter phase, usually the oil, is introduced at the middle or bottom section of the tower, while the heavier phase, usually the solvent, is introduced at the upper part of the tower. The respective phases flow countercurrently under conditions to secure a maximum contact between the solvent and the oil. Contact between the countercurrently flowing phases is usually secured by suitable distributing and contacting means, as for example, packed masses, pierced plates, distributing trays, and the like. Temperature and pressure conditions on the tower are adjusted to secure the formation of a solvent poor or raffinate phase, the oil of which is highly paraffinic in nature, and a solvent rich or solvent extract phase, the oil of which is highly aromatic in character. The respective phases are separated and handled in a manner to remove the solvent from the extract and the raffinate. This is usually accomplished by a distillation process, providing a sufficient differential exists between the boiling points of the solvent and the oil. Other means are also employed, as for example, by re-extraction with a secondary solvent or by washing with water and the like. In these solvent treating processes the removal of the solvent from the respective phases in an efficient and economical manner presents a major problem. It is extremely desirable that the solvent be fully recovered and that the last traces of the solvent be removed from the oil. When operating in this manner a large part of the cost of the entire solvent treating operation is in the recovery of the selective solvent. I have now discovered an improved solvent treating operation in which the selective solvent may be readily removed from the oil in an efficient and economical manner.

Figure 2:
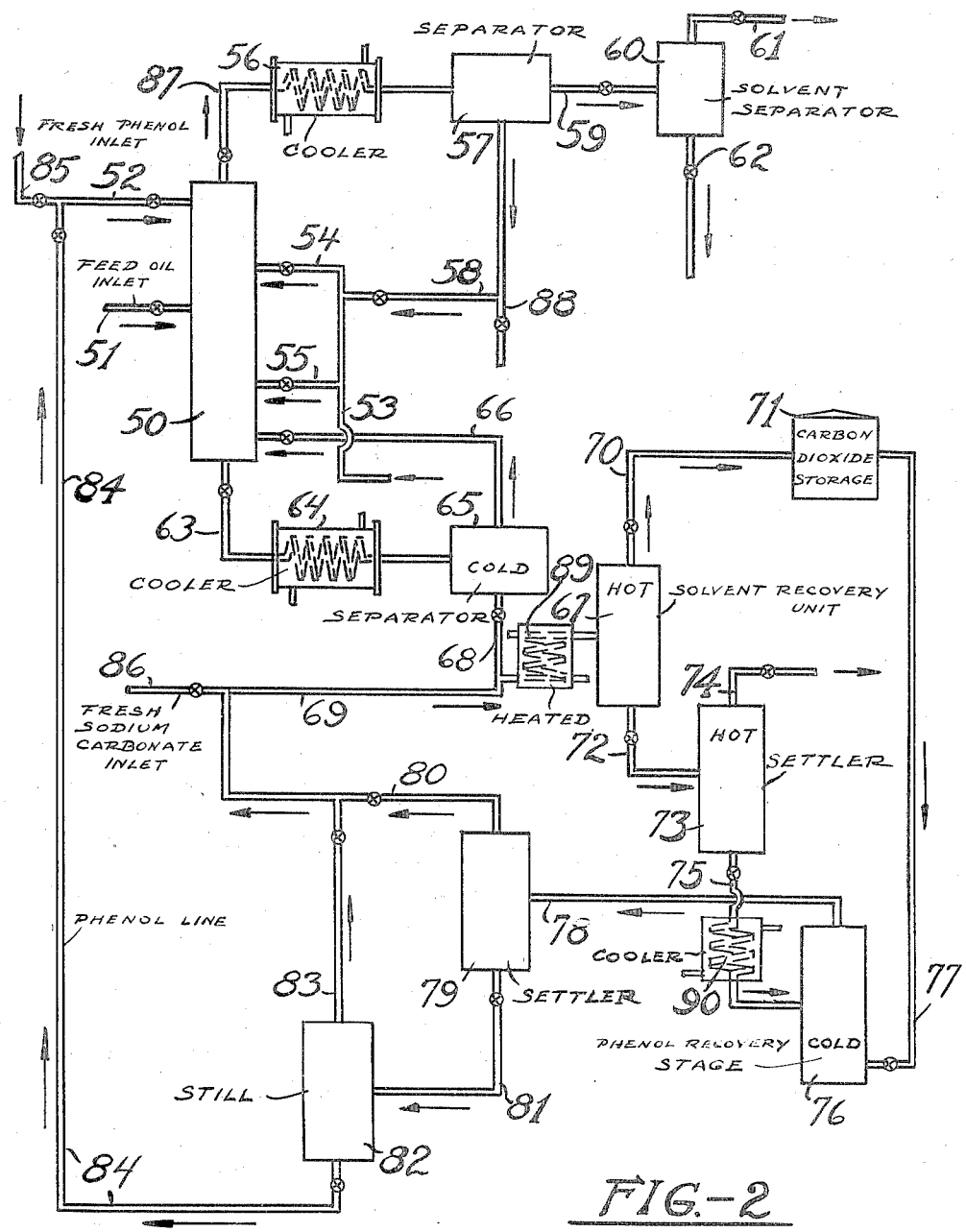

The process of my invention may be fully understood by reference to the attached drawings which are given for the purpose of illustration and should not be construed as limiting the invention in any manner whatsoever. For purposes of illustration it is assumed that the selective solvent is phenol. Figures 1 and 2 illustrate similar processes with the exception that in Figure 1 the phenol and phenolate salts are separated prior to decomposition of the phenolates and regeneration of the phenol.

Referring specifically to Figure 1, a feed oil, which for the purpose of illustration is taken as a petroleum lubricating oil having a gravity of about 25° A. P. I. and a viscosity of about 440 sec. Saybolt at 100° F., is introduced into countercurrent solvent treating tower 1 by means of feed line 2. The selective solvent, which for the purpose of illustration is taken to be phenol, is introduced into counter-current solvent treating tower 1 by means of solvent feed line 3. The solvent and the oil flow counter-currently under conditions adapted to secure the formation of a raffinate phase which is removed from tower 1 by means of line 4 and a solvent extract phase which is removed from tower 1 by means of line 5. The selectivity and the solvent power of the solvent may be modified by the introduction of a solvent modifying agent into tower 1 by means of lines 6, 7, and 8 respectively. The solvent modifying agent is preferably water or phenolic water, although other substances such as glycols, alcohols, and liquefied normally gaseous hydrocarbons may be used. The raffinate phase after removal from tower 1 is preferably cooled in cooler 9 and then introduced into separator 10 in which phase separation occurs. The less paraffinic phase relatively rich in solvent is separated from the more paraffinic phase by means of line 11 and may be introduced into tower 1. Phase separation in separator 10 may be facilitated by the introduction of water or a similar agent by means of line 12. The more paraffinic phase relatively poor in solvent is removed from separator 10 by means of line 13 and introduced into solvent separator 14 which may be a still or steam stripper. Solvent is removed from solvent separator 14 by means of line 15 and may be recycled to line 3. A solvent free raffinate highly paraffinic in nature is removed from solvent separator 14 by means of line 16. The extract phase withdrawn by means of line 5 may be cooled in cooler 17 and then introduced into separator 18 in which a phase separation occurs. The relatively less aromatic oil fraction may be withdrawn from separator 18 and returned to tower 1 by means of line 19. Phase separation may be facilitated by the introduction of water into the solvent extract phase by means of line 20. The more highly aromatic fraction dissolved in the solvent phase is withdrawn from separator 18 by means of line 21, mixed with an alkaline carbonate solution which is introduced by means of line 23, heated in heater 44, and then introduced into an initial solvent recovery stage 22. For the purpose of illustration, the alkaline carbonate solution is assumed to be sodium carbonate. The sodium carbonate is introduced into mixer and heater 44 by means of line 23. Carbon dioxide is removed from the initial (solvent recovery) stage 22 by means of line 24 and passed into carbon dioxide storage 25. A mixture of oil, water, sodium phenolate, and phenol is withdrawn from initial stage 22 by means of line 26 and introduced into settler 27. Settler 27 is maintained at approximately the same temperature and pressure as initial stage 22. In settler 27 an oil phase substantially free of water and solvent forms. This oil phase is withdrawn from settler 27 by means of line 28, and may be subsequently stripped with steam to remove the last traces of phenol. The phenol dissolved in an aqueous phenolate solution is withdrawn from settler 27 by means of line 29, cooled in cooler 45 and then introduced into a secondary stage 30, the temperature of which is in the range from about 75° to 100° F. below the temperature existing in initial stage 22. Under these conditions a phase separation occurs comprising a phenol phase substantially free of water and an aqueous phenolate phase. The phenol layer is withdrawn from secondary stage 30 by means of line 31 and introduced into drying still 32 in which the last traces of water are removed overhead by means of line 33. Substantially anhydrous phenol is withdrawn from unit 32 by means of line 34 and recycled to line 3. The aqueous phenolate phase formed in secondary stage 30 is withdrawn from said stage by means of line 35 and introduced into a phenol recovery stage 36. In this stage the phenolates are converted into corresponding phenols by treatment with carbon dioxide which is introduced from carbon dioxide storage 25 by means of line 37. The mixture consisting of phenol and sodium carbonate solution is removed from phenol recovery stage 36 by means of line 38 and introduced into settler 39. Phenol is removed from settler 39 by means of line 40 and introduced into phenol line 31. The carbonate solution is removed from settler 39 by means of line 41. The water removed from drying unit 32 by means of line 33 is introduced into the carbonate solution removed by means of line 41. The aqueous carbonate solution is recycled by means of line 23. Fresh carbonate solution may be introduced into the system by means of line 42 while fresh phenol may be introduced into the system by means of line 43.

Referring specifically to Figure 2, feed oil, which is taken as a petroleum lubricating oil having a gravity of about 25° A. P. I. and a viscosity of about 440 sec. Saybolt at 100° F., is introduced into solvent treating tower 50 by means of line 51. A selective solvent, which for the purpose of illustration is taken to be phenol, is introduced into tower 50 by means of line 52. These phases flow countercurrently under conditions adapted to secure the formation of a raffinate phase and the formation of a solvent extract phase. The selectivity and the solvent power of the solvent may be modified or adjusted by the introduction of a solvent modifying agent, as for example, water into tower 50 by means of lines 53, 54, and 55 respectively. The raffinate phase is withdrawn from tower 50 by means of line 87. This phase may be cooled in cooler 56 and then introduced into raffinate separator 57. The less paraffinic phase containing a relatively large amount of solvent may be removed from separator 57 by means of line 58 and introduced into solvent treating tower 50 or withdrawn by means of line 88. The more paraffinic phase is removed from separator 57 by means of line 59 and introduced into solvent separator 60 which may be a still or stripping unit. The solvent is removed from solvent separator 60 by means of line 61, while the solvent-free raffinate is removed by means of line 62. The solvent extract is removed from tower 50 by means of line 63 and may be cooled in cooler 64 and then introduced into separator 65. The more paraffinic phase may be removed from separator 65 and introduced into tower 50 by means of line 66. The more aromatic fraction is mixed with an alkaline carbonate solution which is introduced by means of line 69, heated in heater 89, and then introduced into initial solvent recovery stage 67 of a solvent recovery unit. For purposes of illustration, the alkaline carbonate solution is assumed to be sodium carbonate. Carbon dioxide is removed from initial stage 67 by means of line 70 and introduced into carbon dioxide storage 71. The extract solution consisting of oil and phenol dissolved in aqueous sodium phenolate is removed from initial stage 67 by means of line 72 and introduced into a settler 73 maintained at a temperature substantially equivalent to the temperature of stage 67. An oil phase substantially free of solvent and water forms in settler 73 and is removed by means of line 74. The oil free aqueous solution of phenol and phenolates is withdrawn from settler 73 by means of line 75, is cooled in cooler 90 to about 100° F. below the temperature in settler 73 and is introduced into a phenol recovery stage 76. The sodium phenolates are decomposed in phenol recovery stage 76 by means of carbon dioxide which is removed from carbon dioxide storage 71 and introduced into stage 76 by means of line 77. The mixture of phenol, water, and sodium carbonate solution is withdrawn from stage 76 by means of line 78 and introduced into settler 79 in which a sodium carbonate solution phase and a phenol phase form. Sodium carbonate solution is withdrawn from settler 79 by means of line 80 and recycled to line 69. Phenol is removed from settler 79 by means of line 81 and introduced into still 82 in which the last traces of water are removed therefrom. The water is removed from still 82 by means of line 83 and introduced into the sodium carbonate solution removed from settler 79 by means of line 80. Phenol substantially free of water is removed from still 82 by means of line 84 and recycled to line 52. Fresh phenol may be introduced into the system by means of line 85, while fresh sodium carbonate may be introduced into the system by means of line 86.

The process of the present invention may be widely varied. The process may be applied in the recovery of solvents used in the treatment of petroleum oils boiling in the lubricating, heavy naphtha, or light naphtha range. The invention is particularly applicable in the recovery of phenolic type solvents, as for example, cresol, phenol, and other weakly acidic reacting solvents. The invention, however, is particularly applicable in the recovery of mono-hydroxy phenol.

The temperature and pressure conditions maintained in the solvent treating tower will depend upon the particular solvent being employed, the oil being treated, and upon the yield and quality of products desired. In general, atmospheric pressures are employed and a temperature in the range between the melting point of the solvent and the temperature at which complete miscibility occurs between the solvent and the oil. Preferred conditions are such that a temperature of about 200° F. or higher is maintained at the point at which the solvent extract phase is withdrawn from the system. The extent to which the solvent extract phase is chilled to secure the separation of a relatively more paraffinic fraction will depend upon the amount of oil it is desired to precipitate and may be varied considerably. However, it is preferred that the temperature of the solvent extract in the initial stage in which the extract contacts the carbonate solution should be in the range from about 150° F. to 225° F., preferably in the range of about 212° F. Although under certain conditions it may be desirable to employ excess pressures, in general it is preferred to employ atmospheric pressure. The temperature in the settler should be substantially equivalent to the temperature maintained in the initial solvent recovery stage. The temperature in the phenol recovery stage of the solvent recovery system is preferably maintained in the range from about 50° to 100° below the temperature maintained in the initial stage. The pressure maintained in said tertiary or phenolate decomposition stage may vary from about 1 to 50 atmospheres, depending upon the temperature employed and is preferably in the range not over 10 atmospheres.

Although any water soluble carbonate may be contacted with the solvent extract in the initial stage of the solvent recovery system, it is preferred to employ alkali carbonate such as sodium and potassium carbonate. The quantity of carbonate used is preferably an aqueous solution comprising 10 to 30% carbonate in an amount sufficient to secure the conversion of about 20 to 30% of the solvent to the alkali phenolates. I have found that an aqueous solution of approximately 25% phenolates will substantially dissolve all the remaining phenol and cause the separation of a solvent free oil.

Under certain operations in which water is added to the solvent extract phase in order to cause precipitation of a relatively highly paraffinic oil, I have found it preferable to add a small amount of the salt of the present invention to the water. This will increase the rate of separation of the oil and reduce the concentration of oil remaining in the phenol layer. The alkali carbonates are particularly desirable in this respect since they decrease the water-phenol miscibility temperature and permit working at lower temperatures and pressures.

In order to further illustrate the invention, the following examples are given which should not be construed as limiting the invention in any manner whatsoever.

EXAMPLE 1

Various amounts of sodium carbonate were added to water used in washing spent phenol from solvent extracts. The operations were conducted under uniform conditions with the following results:

TABLE 1

| Percent $Na_2CO_3$ in solution | Volume of oil separating in 15 minutes at 200° F. | Percent oil in phenol layer at 75° F. |
| --- | --- | --- |
| 0.0 | 4 | 4.0 |
| 2 | 12 | 1.5 |
| 4 | 11 | 1.75 |

EXAMPLE 2

A material balance further illustrating the present invention is as follows:

*Solvent treating tower*

(Volumes)

| | Feed | | | Withdrawn | |
| --- | --- | --- | --- | --- | --- |
| | Oil feed | Solvent feed | Water injected | Raffinate phase | Extract phase |
| Oil | 100 | | | 74 | 26 |
| Phenol | | 200 | | 18 | 183 |
| Water | | | 10 | | 10 |
| Total | 100 | 200 | 11 | 92 | 219 |
| | | 311 | | 311 | |

*Initial stage and settler*

| | Feed | | Withdrawn | | |
| --- | --- | --- | --- | --- | --- |
| | Extract phase | 25 percent sodium carbonate | Extract | Phenol aqueous salt phase | Carbon dioxide |
| Oil | 26 | | 26 | | |
| Phenol | 183 | | Trace | 138 | |
| Phenolate | | | | 45 | |
| Water | 10 | 100 | | 110 | |
| Total | 219 | 100 | 26 | 293 | |
| | 319 | | | 319 | |

*Secondary stage*

| | Feed | Withdrawn | |
| --- | --- | --- | --- |
| | Phenol aqueous salt phase | Aqueous phenolate | Phenol |
| Phenol | 138 | | 138 |
| Phenolate | 45 | 45 | |
| Water | 110 | 95 | 15 |
| Total | 293 | 140 | 153 |
| | 293 | 293 | |

*Tertiary stage and settler*

| | Feed | | Withdrawn | |
|---|---|---|---|---|
| | Aqueous phenolate | Carbon dioxide | Phenol phase | Aqueous carbonate phase |
| Phenol | | | 45 | |
| Phenolate | 45 | | | |
| Water | 95 | | 5 | 90 |
| Total | 140 | | 50 | 90 |
| | 140 | | 140 | |

*Phenol drier*

| | Feed | | Withdrawn | | |
|---|---|---|---|---|---|
| | Phenol from secondary stage | Phenol from tertiary stage | Phenol | Phenol water stage | Water to carbonate solution |
| Phenol | 138 | 45 | 182 | 1 | |
| Water | 15 | 5 | | 10 | 10 |
| Total | 153 | 50 | 182 | 11 | 10 |
| | 203 | | | 203 | |

The process of the present invention is not to be limited by any theory or mode of operation, but only by the following claims in which it is desired to claim all novelty insofar as the prior art permits.

I claim:

1. Solvent treating process comprising contacting a petroleum oil with a phenol solvent under conditions adapted to secure the formation of a raffinate phase and a solvent extract phase, separating the solvent extract phase and mixing the same with an aqueous alkali metal carbonate solution under conditions to convert a portion of the phenol to the corresponding alkali metal phenolate and to secure the formation of an extract phase substantially free of phenol and phenolates, and an aqueous phenol phenolate phase substantially free of extract, separating the extract phase from the aqueous phenolate-phenol phase, cooling the latter phase to separate a phenol phase from an aqueous phenolate phase, treating the aqueous phenolate phase with carbon dioxide to convert the phenolate to the corresponding phenol.

2. Process in accordance with claim 1 in which said solvent is monohydroxy phenol and in which said aqueous alkali metal carbonate solution is sodium carbonate solution.

3. Process in accordance with claim 1 in which approximately 20 to 30% of the phenol is converted to the corresponding alkali metal phenolate.

4. Solvent treating process comprising treating a petroleum oil with phenol under conditions to form a solvent extract phase and a raffinate phase, removing the solvent extract and treating the same in an initial stage with an aqueous sodium carbonate solution under conditions to convert approximately 20 to 30% of the phenol in said phase to the corresponding phenolate and to secure the formation of a substantially pure extract layer and the formation of an aqueous phenolate phenol phase substantially free of extract, separating the extract from the aqueous phenolate-phenol phase, cooling said latter phase in a secondary stage to secure the formation of a phenol phase and an aqueous phenolate phase, subjecting said aqueous phenolate phase to treatment in a tertiary stage with carbon dioxide evolved from said initial stage under conditions to convert the phenolate to the corresponding phenol, combining the phenol from the secondary stage and the phenol from the tertiary stage and recycling the same to the process.

5. Process for the removal of phenol from solvent extracts secured in the solvent treatment of petroleum oils comprising contacting said solvent extract in an initial stage with a sodium carbonate solution at a temperature in the range of about 150° F. to 225° F. under conditions to convert approximately 20% to 30% of the phenol to the corresponding phenolate, removing carbon dioxide therefrom, passing the liquid products from said initial stage to a secondary stage and maintaining the temperature in the secondary stage substantially equivalent to the temperature in said initial stage whereby an oil layer substantially free of phenol and phenolates and an aqueous phenol-phenolate salt phase substantially free of oil are formed, removing the oil phase, cooling the aqueous phenol-phenolate salt solution phase in a tertiary stage whereby a phenol layer and a phenolate salt solution layer form, separating the phenolate layer and regenerating the corresponding phenol from said phenolate solution phenol stage by contacting with said carbon dioxide removed from said initial stage, combining the phenol from said tertiary stage and said final stage, and recycling the same to the process.

6. Process in accordance with claim 5 in which the aqueous phenol-phenolate salt phase is cooled 75° to 100° F. below the temperature maintained in said initial stage.

7. Solvent treating process comprising countercurrently contacting a petroleum oil with phenol under conditions to form a raffinate and a solvent extract phase, separating said solvent extract phase and adding thereto an equivalent volume of a 2% to 4% sodium carbonate solution whereby an oil phase and an aqueous sodium carbonate solvent extract phase form, separating said latter phase, contacting said latter phase with additional quantities of sodium carbonate solution at a temperature in the range of about 150° F. to 225° F. under conditions to form a substantially pure oil phase and an aqueous phenol phenolate phase, removing carbon dioxide therefrom, maintaining the temperature in this range and removing the resulting oil phase from the aqueous phenol-phenolate solution phase, cooling the aqueous phenol-phenolate solution phase from about 75° to 100° F. whereby a phenol layer and a phenolate solution layer form, separating the phenolate layer and regenerating the corresponding phenol from said phenolate layer by contacting with said carbon dioxide, separating the regenerated phenol, combining the respective phenol streams and recycling the same to the system.

CHARLES S. LYNCH.